Inventors
Richard A. Butler, Jr.
Norton T. Pierce
By their Attorney
Maurice R. Boiteau Feb. 21, 1967 R. A. BUTLER, JR., ETAL 3,305,189

WEB SUPPLY APPARATUS

Filed Dec. 21, 1964 10 Sheets-Sheet 4

Feb. 21, 1967 R. A. BUTLER, JR., ETAL 3,305,189

WEB SUPPLY APPARATUS

Filed Dec. 21, 1964 10 Sheets-Sheet 9

United States Patent Office 3,305,189
Patented Feb. 21, 1967

3,305,189
WEB SUPPLY APPARATUS

Richard A. Butler, Jr., 218 Middlesex Road, Brookline, Mass. 02146, and Norton T. Pierce, Concord, Mass.; said Pierce assignor to said Butler Filed Dec. 21, 1964, Ser. No. 419,969
10 Claims. (Cl. 242—58.1)

This invention relates generally to improvements in apparatus for providing web uninterruptedly to machines which consume the web at high speeds. More particularly the invention relates to improvements in apparatus for splicing the leading end of a roll of ready web to the trailing end of a depleting roll and for controlling delivery to the web consuming machine especially when the web supply roll is a heavy one and the web consuming machine is one which consumes web at the rate of a modern high speed press.

A general object of the present invention is to improve the reliability and uniformity of splices in supplying web uninterruptedly to high speed web-consuming machines.

Another object is to form splices either automatically upon the occurrence of certain predetermined depletion conditions or at any time upon command.

Still another object is to splice a new web supply roll to a depleting one while maintaining the speed of the web consuming machine.

Still another object is to provide accurately the degree of acceleration which is imparted to the new web supply roll at the time of splice formation to avoid either immediate rupture of the web from excessive tension caused by under-acceleration or secondary rupture resulting from over-acceleration which causes initial slack in the web and then suddenly overstresses the web as demand catches up with supply.

Another important object of this invention is economically to provide apparatus for both splicing and controlling web delivery.

In the achievement of the foregoing objects a feature of the invention resides in a novel dancer roll arrangement which is employed not only for providing a reservoir of web to compensate for differences in web supply and demand speeds but which is also coupled to sensing and translating devices to modulate braking and accelerating forces applied to the web supply rolls. The quantity of web remaining in the dancer assembly is continuously measured and the measurement employed as a basis for modulating the braking force applied to the depleting web roll and the accelerating force applied to the ready web in accordance with the specific conditions obtaining at the time of formation of each splice. The present apparatus is accordingly more versatile and adapted to use over a much greater range of web strength and operating speeds than has heretofore been possible with similar devices.

In the present apparatus the splicing is accomplished by a pair of nip rolls interposed between the web supply roll and the dancer roll assembly. According to another feature of the invention each splice is formed on a depleting web which has been slowed down at the nip rolls to a predetermined splicing speed. No matter what the web requirements of the consuming machine may be within broad limits of between 500 and 2,000 feet per minute the web at the nip rolls is first slowed down at a programmed rate by the application of braking force to the depleting web supply roll. A tachometer is employed to measure the speed of the web at the nip rolls while the difference between the input to the dancer assembly and the requirement from the web consuming machine is made up by the quantity of web already stored in the dancer roll assembly. The splice is formed only in response to a signal from the tachometer that the predetermined splicing speed has been reached. The result of forming successive splices at a uniform controlled speed is a high degree of reliability in splice formation and uniformity in the character of the splices.

At the time of splice formation a greater or lesser impulse is imparted to the new web supply roll in accordance with the quantity of web remaining in the dancer assembly. For this purpose there is provided according to another feature of the invention a valve which is opened to allow the flow of hydraulic fluid in proportion to the depletion of web in the dancer assembly. The flow of hydraulic fluid through the valve regulates the speed of a piston which, at the time of splice formation, imparts to the ready web roll an accelerating stroke at a speed proportional to the operational need of the dancer assembly. Thus when forming a splice in web being fed to a web consuming machine operating at a low speed the reduction of web speed at the nip rolls consumes less of the web stored in the dancer assembly and a relatively light slow impulse is imparted to the new web roll. However, when the speed of the web consuming machine is relatively high and a greater portion of the web in the dancer assembly is accordingly consumed during deceleration, the accelerating impulse to the new web supply roll is greater so that the reservoir in the dancer assembly is more quickly restored to normal operating conditions.

The numerous objects and features and many advantages of the present invention will be more readily understood from the detailed description of an illustrative embodiment taken in connection with the accompanying drawings in which.

Figure 21:
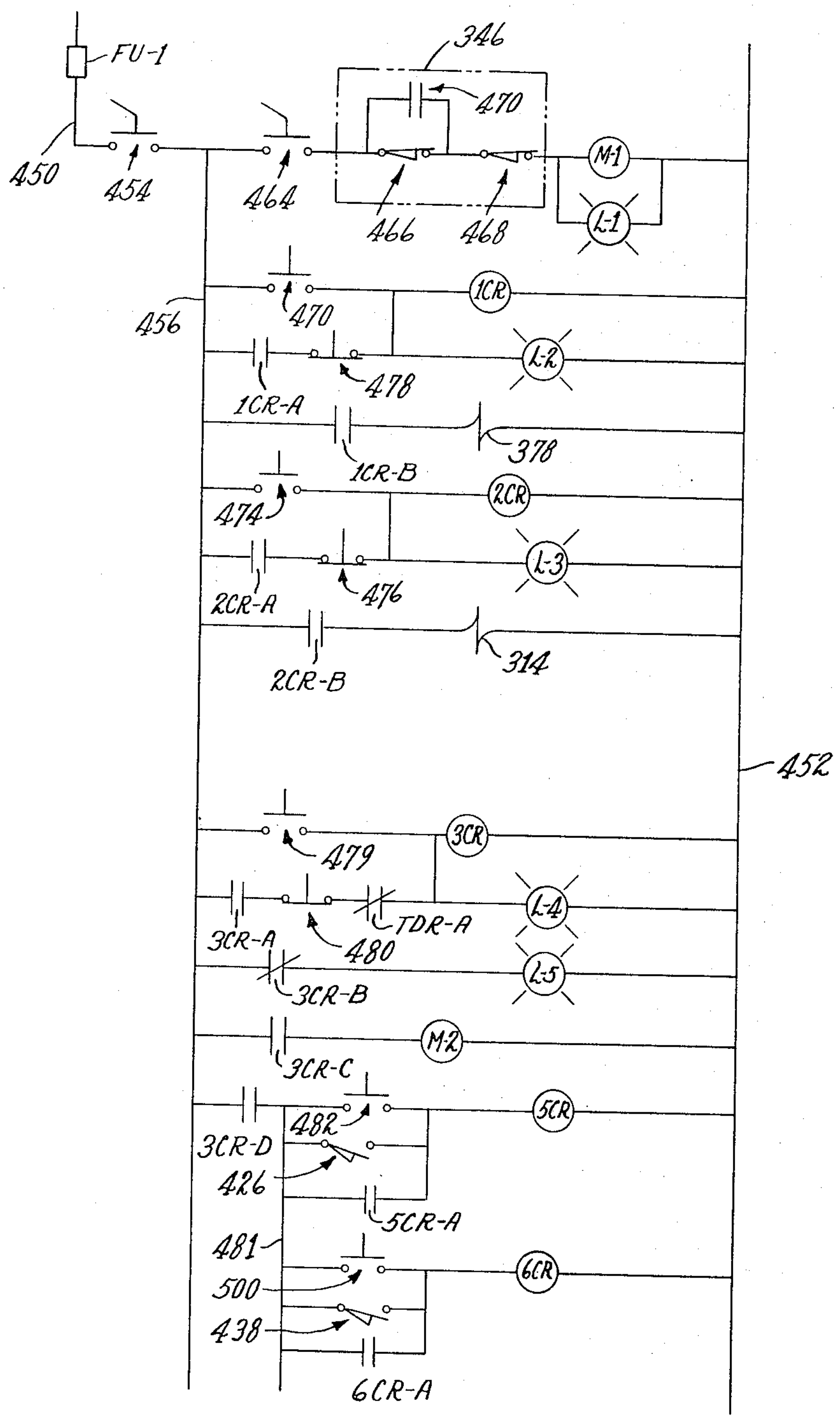
Figure 21A:
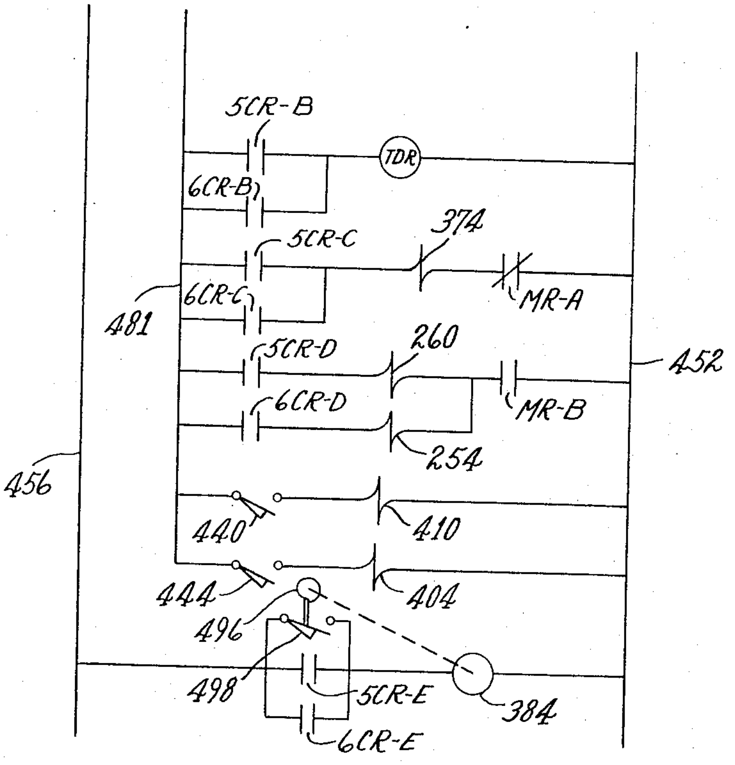
Figure 22:
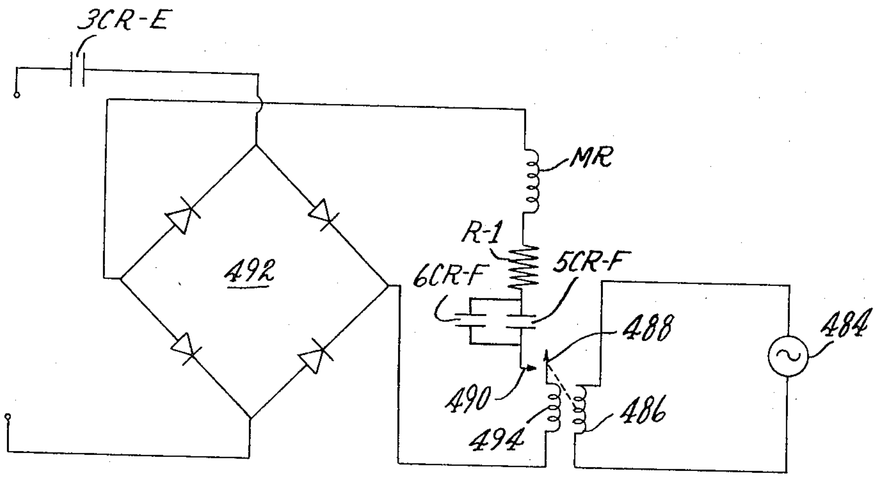

FIGS. 21 and 21*a*, which are intended to be read together as one figure, are a diagram of electrical control circuits; and FIG. 22 is a schematic diagram of electrical devices associated with a tachometer which is a part of the apparatus.

Figure 1:
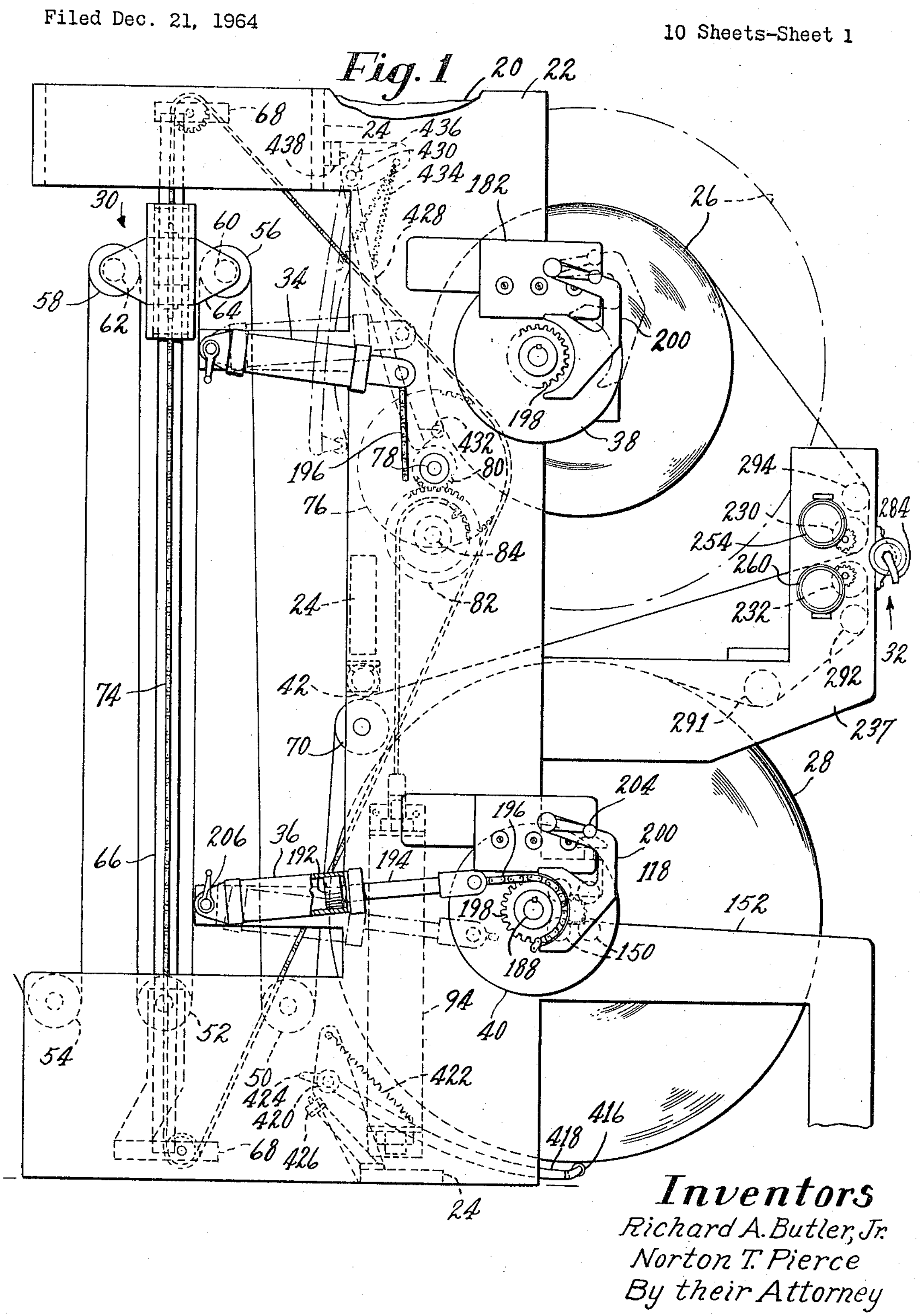
FIG. 1 is a view in right side elevation of a combined splicing apparatus and unwind stand according to the present invention.
Figure 2:
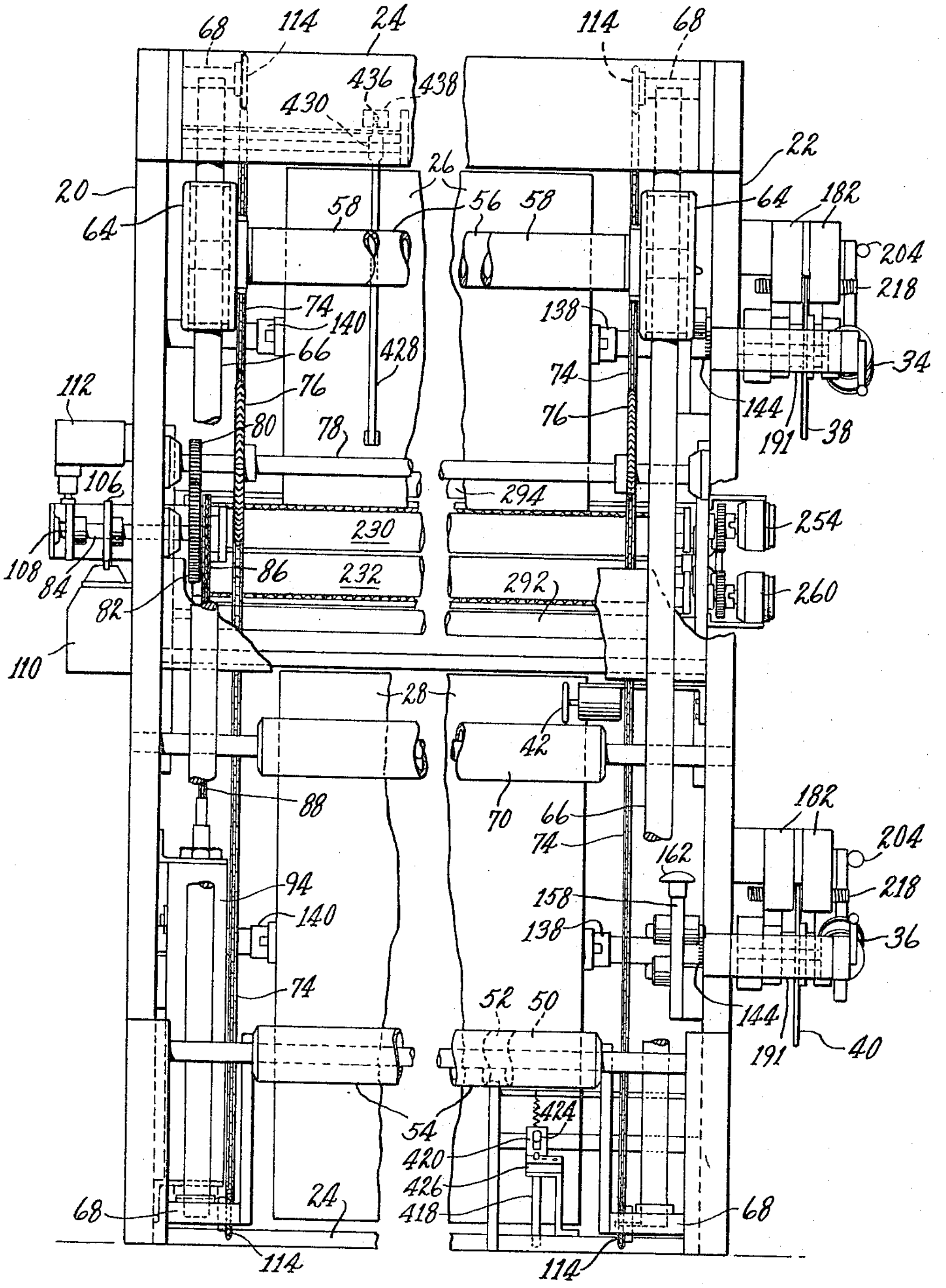
FIG. 2 is a view in front elevation of the apparatus depicted in FIG. 1.
Figures 3, 4:
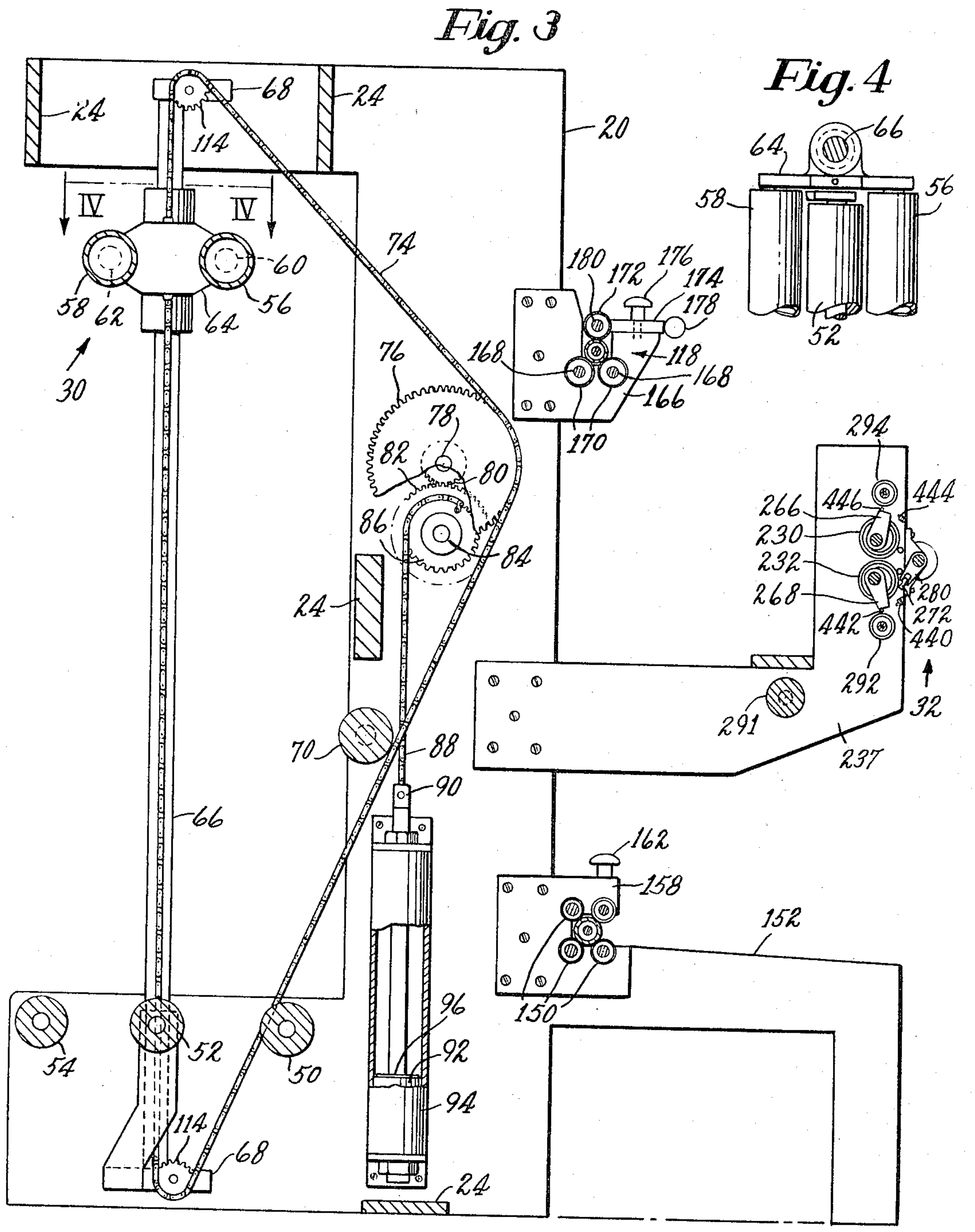
FIG. 3 is a view in longitudinal section of the left side of the apparatus shown in FIGS. 1 and 2 particularly showing the construction of a dancer roll assembly.
FIG. 4 is a fragmentary plan view of a part of the dancer roll assembly more fully depicted in FIG. 3.

Referring now to the drawings particularly FIGS. 1 to 3 the present splicer comprises a frame including a pair of plates or frame members 20 and 22 supported vertically in spaced-apart relationship by a plurality of cross bars 24.

As shown in FIG. 1 there are supported on the frame two web supply rolls one above the other at the rear or input end of the apparatus. The upper roll 26 is shown in solid lines as the partially depleted running web while the lower roll 28 is a supply of ready web, the leading end of which is arranged to be spliced to the trailing end of the roll 26 either upon command or upon predetermined depletion of the roll of running web. At the front or output end of the splicer there is provided a dancer assembly indicated generally at 30 while a splicing station indicated generally at 32 is provided at the rear. Mounted on the outside of the plate 22 is a ready web accelerating device for each of the rolls 26 and 28 respectively including hydraulic cylinders 34 and 36.

A detailed description of the various portions of the present splicer will be more fully appreciated from a very generalized description of an operating cycle beginning at a time when the running web roll 26 is approaching depletion. At that time either upon command of an operator or automatically in response to a signal indicating the predetermined degree of running web roll depletion the splicing cycle is initiated. Prior to the start of the splicing cycle, a quantity of web is stored by the dancer assembly 30 so that the speed of the web delivered at the front of the splicer, the left as seen in FIG. 1, is not reduced for the formation of the splice. While the roll 26 is unwinding the leading end of the ready web from the roll 28 is prepared for splicing and supported at the splicing station 32 until the time of splice formation. At the start of the splicing cycle the speed of the running web is gradually reduced according to a predetermined deceleration rate suited to the operating parameters of web strength and operating speed of the web consuming machine. The reduction in web speed is accomplished by brake pads which apply a braking force to a disk 38 coupled to the running web supply roll. A similar brake disk 40 is associated with the ready web roll 28. As the web from the roll 26 is being decelerated, the speed of the running web is measured continuously by a tachometer including a wheel 42 in contact with the web. When a predetermined web speed reduction has been reached, the mechanism at the splicing station 32 is actuated to splice the leading end of the web from the ready roll 28 to the running web from the roll 26 and the web from the roll 26 is cut off immediately behind the splice at the same time to limit the length of double web fed to the web consuming machine. As the splice is formed the accelerator including the hydraulic cylinder 36 is actuated to set the roll 28 in rotation. The accelerator operates by imparting a single kick to the roll 28 and the force of the kick is modulated in accordance with the degree to which the web in the dancer assembly 30 has been depleted during the deceleration of the web from the roll 26. After the splice has been formed and the old running web cut off, the reservoir of web in the dancer assembly 30 is restored to normal operating level such as that shown in FIG. 1. The unwinding of the web from the roll 28 is thereafter continuously controlled by the application of a variable braking force to the disk 40, the force being varied in accordance with the quantity of web in the dancer assembly 30, which serves not only as a web reservoir but also as a sensor for modifying braking force according to operating conditions during unwinding and also for modifying the degree of kick imparted to the ready web at the time of splice formation.

The dancer assembly comprises rolls 50, 52 and 54, each rotatably supported on a stationary shaft mounted between the plates 20 and 22. There also are two movable rolls 56 and 58 rotatable respectively on shafts 60 and 62 supported in a pair of spaced apart vertically movable yokes 64. Each of the yokes 64 is slidable on a cylindrical rod 66 fixedly supported in the frame. The two rods 66 are disposed in parallel relationship between ears 68 secured to the plates 20 and 22.

From a guide roll 70 in advance of the dancer assembly 30 the web passes successively over the rolls 50, 56, 52, 58 and 54 to the web consuming machine. The yokes 64 are urged upwardly to maintain a supply of web and coupled to provide a basis for regulating braking force to the running web and accelerating force to the new web supply roll through connections including a pair of roller chains 74. The ends of each chain 74 are connected to one of the yokes 64 to form a closed loop passing over sprocket 76 fixed to a shaft 78 which is rotatably mounted in the frame members 20 and 22. The shaft 78 also carries keyed to it a pinion 80 which meshes with a gear 82 keyed to a stub shaft 84 journaled in the plate 20 in parallel relation with the shaft 78. There is also keyed to the shaft 84 a sprocket 86 having wrapped around it one end of a roller chain 88 which is connected at its other end to a rod 90 of a piston 92. The piston 92 is slidable in a cylinder 94 and has an upper face 96 against which pressure is exerted by air under pressure so as to cause the dancer rolls 56 and 58 to move upwardly as the piston 92 is pressed downwardly. The size of the sprockets 76, 86 the pinion 80 and the gear 82 are designed to match the stroke of the piston 92 to the travel of the yokes 64.

Also mounted on the shaft 84 but outside the frame member 20 are cams 106 and 108 which respectively actuate control valves 110 and 112 for regulating the flow of fluid to the hydraulic cylinders 34 and 36 and the braking force applied to the disks 38 and 40 respectively.

As a downward force is exerted on the chain 88 by the piston rod 90 the roller chains 74 urge the yokes 64 upwardly thus tending to store a greater quantity of web in the dancer assembly 30. At the same time the roller chains 74 through the cams 106 and 108 continuously meter the quantity of web stored in the dancer roll assembly 30. The cams 106 and 108 are formed to translate this metering into the amount of kick required to set the ready web roll into action at the time of splice formation and the braking force necessary to maintain a relatively constant web supply in the dancer roll assembly 30 during the unwinding of the web.

Figures 5, 6, 7, 8, 9, 10, 11:
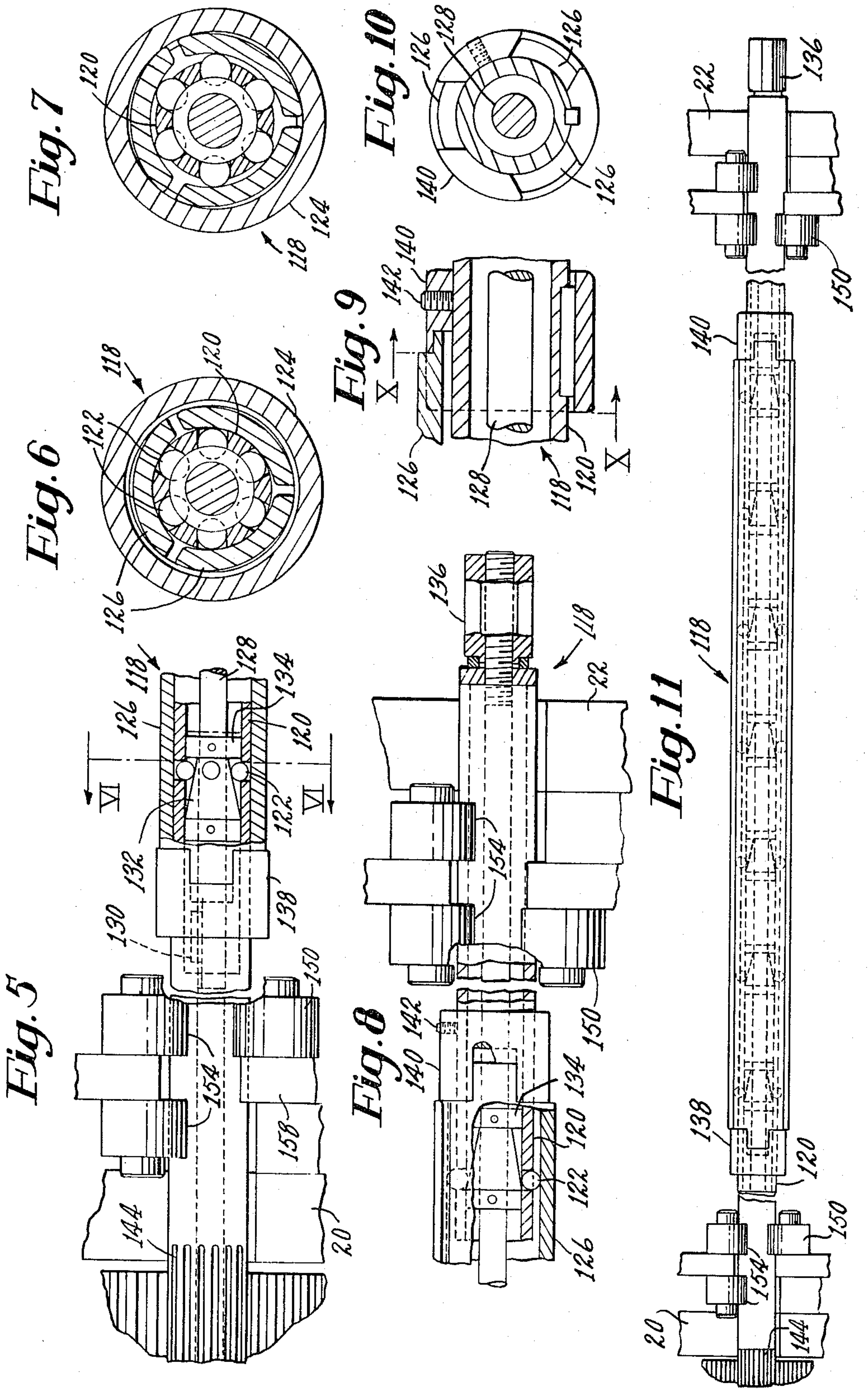
FIG. 5 is a fragmentary detailed view partially in section of one end of an arbor for supporting a web supply roll.
FIG. 6 is a view in cross section taken along the lines VI—VI of FIG. 5 showing the relative disposition of arbor parts before a web roll is gripped.
FIG. 7 is a view in cross section taken along the same line as FIG. 5 and showing a web supply roll being gripped on the arbor.
FIG. 8 is a detail view also partially in section of the other end of the arbor depicted in FIG. 5.
FIG. 9 is a fragmentary view in cross section showing the mounting of web roll engaging parts of the arbor.
FIG. 10 is a view in cross section taken along the line X—X of FIG. 9.
FIG. 11 is an assembly view of the arbor.

An advantageous form of arbor indicated generally at 118 for supporting web supply rolls wound on tubular cardboard cores is shown in FIGS. 5–12 and comprises a perforated sleeve 120. Balls 122 of a plurality of sets spaced at regular intervals along the length of the arbor project through the perforations in the sleeve 120. The core of the web supply roll indicated by the reference numeral 124 in FIGS. 6 and 7 is internally gripped by sectors 126 which expand as the balls 122 are forced outwardly. For this purpose there is slidably mounted inside the sleeve 120 a shaft 128 bearing a key 130 to prevent its rotation. For imparting outward movement to the balls 122 there is provided on the shaft 128 for each set of balls a cone 132 and a collar 134 both pinned to the shaft. By turning a nut 136 engaging threads on a portion of the shaft 128, the balls 122 press outwardly on the sectors 126 and thus grip the core 124 internally. The sectors 126 are supported with freedom to move radially on the sleeve 120 by collars 138 and 140 each secured by a set screw 142 to the left and right end of the sleeve respectively. Each of the collars is keyed to the sleeve 120 and formed with a series of slots the inner end of each of which is undercut to receive the thinned end portion of a sector 126 thereby retaining the sectors with freedom to move radially outwardly under the force of the balls 122. The arbor is coupled to the accelerating and braking devices through an integral pinion 144 formed in the left end of the sleeve 120 as seen in FIGS. 5 and 11.

Figure 12:
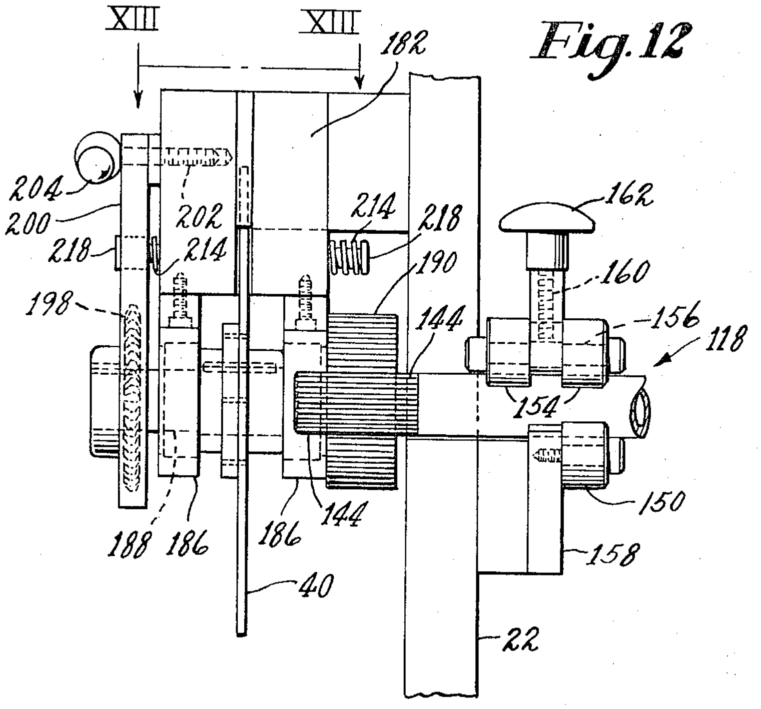
FIG. 12 is a detail view in rear elevation of elements associated with the arbor in the splicer.

The arbor 118 is rotatably supported in the frame on a set of rolls. Because of the difference in the direction from which the arbor 118 reaches its unwinding position at the upper and lower unwind positions a different supporting roll arrangement is provided at the two unwind stations. As seen in FIGS. 1 and 3 the arbor 118 is supported in the lower position, that of the ready web roll 28, by three rolls 150 rotatable on axles fixedly supported and extending inwardly from each of the plates 20 and 22. In loading the roll in the lower unwind position the arbor is normally lowered onto a pair of spaced apart inclined surfaces 152 formed on each of the plates 20 and 22 and rolled upwardy and to the left as seen in FIG. 1 to be cradled in contact with the two lower rolls 150 while being limited in leftward movement by the upper roll 150. At each of the plates 20 and 22 there is provided a retaining device to prevent displacement of the arbor 118 from its unwind position and this retaining device as best seen in FIG. 12 comprises a pair of rolls 154 rotatably supported on a short shaft 156 which is vertically adjustable to retain the arbor 118 against displacement to the right as seen in FIG. 1. The adjustment of the roll 154 is provided by a slidable mounting for that portion of the shaft between the two rolls 154 in a slot cut in a plate 158 secured to the inside of each of the frame members 20 and 22 and in turn supporting the rolls 150 in its inside surface. In order to lock the rolls 156 in arbor retaining position, there is provided a threaded stud 160 which enters the upper end of the vertical slot in which the shaft 156 is slidable. By turning a hand knob 162, the stud 160 is brought to bear on the central portion of the shaft 156 and thus retains the rolls 154 against vertical displacement and prevents movement of the arbor 118 to the right.

At the upper web unwind position, that occupied by the roll 26, there is no obstruction to the arbor 118 being received in position directly from above and so supporting structure for the arbor is there slightly modified. As seen in FIG. 3 there is fixed to the inside of the plate 20 a generally U-shaped plate 166 and a similar plate is fixed to the inside of the frame member 22. On the inside of each of the plates 166 there is rotatably supported each on a shoulder screw 168 a pair of rolls 170 at each side of the frame. The arbor 118 is lowered into a cradle formed by the two pairs of rolls 170 and retained in place at each side by a pair of rolls 172 mounted on a slide 174 and retained in position by a clamp screw 176. A handle 178 is provided at the rear of slide 174. Of the two rolls 172 of each pair associated with a slide one is mounted inboard and the other outboard somewhat after the manner of the rolls 154 at the lower unwind position with the exception that a shaft 180 on which the rolls are rotatable is fixed to the slide 174.

Devices for accelerating a new web supply roll at the time of splice formation and for applying braking force to the depleting roll at the time of splice formation and thereafter to the new web supply roll during unwind is best seen in FIGS. 1 and 12. These devices are in exact duplicate at the two unwind stations and accordingly only that associated with the lower position will now be described in detail. On the outside of the frame member 22 there is fixedly supported a brake block 182 slotted to receive a portion of the brake disk 40. Below the lock 182 there is rotatably supported in a pair of spaced pillow blocks 186 a shaft 188 which carries keyed to it, the brake disk 40 and also carries inboard from the disk a gear 190 which meshes wih the pinion teeth 144 cut in the arbor 118. Both braking and accelerating forces are applied to the arbor 118 through the shaft 188. For starting each new web supply roll in rotation, there is provided a novel and versatile accelerator including the hydraulic cylinder 36 supported on a bracket 191 at the lower unwind station as seen in FIG. 2. The accelerator additionally comprises a piston 192 mounted on a rod 194 and slidable in the cylinder 36. The distal end of the rod 194 is coupled to a roller chain 196 which is laid in engagement with a sprocket 198 keyed to the shaft 188. The chain 196 is retained in engagement with the sprocket 198 by a guard 200 which is pivoted and clamped at a point above the shaft 188. For this purpose a threaded clamp stud 202 to which is pinned a ball crank 204 passes loosely through the guard 200 and engages the threads of a tapped hole in the block 182.

The versatility of the present splicer is enhanced both because the stroke of the piston 192 is modulated for varying the acceleration imparted to the new web supply roll and also because the present accelerator may be coupled to impart a torsional force to the new web supply roll either in the clockwise direction as seen in FIG. 1 or in the opposite direction. Variations in the speed of the piston 192 are achieved by the valve 110 which restricts the flow of hydraulic fluid being exhausted from the cylinder 36 as will be more fully seen from the description of the hydraulic circuit of the present splicer. For reversing the direction of acceleration of the new web supply roll the cylinder 36 is merely pivoted to the position shown in dot and dash lines in FIG. 1 and the chain 196 is laid in the opposite direction about the sprocket 198. At the end of the accelerating stroke of the piston 192 the chain 196 merely drops off the sprocket 198 and does not interfere with the rotation of the shaft 188. After the accelerating stroke of the piston 192 to the left as seen in FIG. 1, the piston is automatically returned to the right and the chain is merely placed in engagement with the sprocket 198 by the operator in preparing a new ready web roll for splicing.

Figure 13:
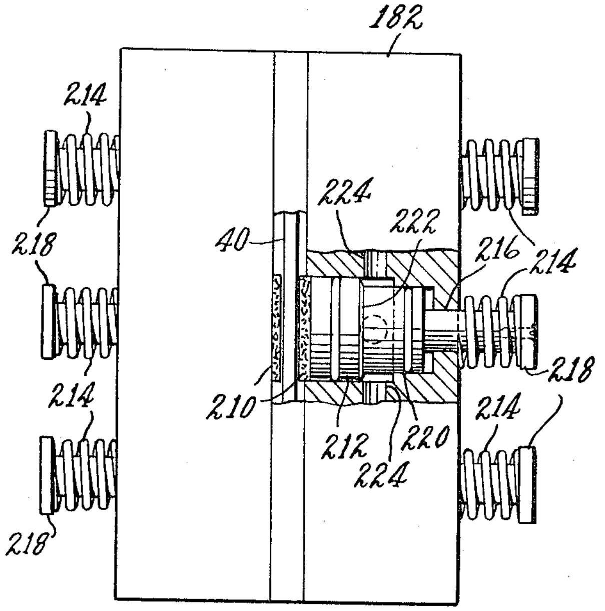
FIG. 13 is a detail view of a brake for controlling the speed of the web.

The braking arrangement at the two unwind stations is also the same and so the devices for this purpose at the lower station will be the only ones described with reference to FIGS. 1, 12 and 13. Braking force is applied to the disk 40 by three pairs of opposing brake pads 210 each mounted on the forward face of a piston 212. Each of the pistons 212 is slidable in a cavity in the block 182 and is urged away from the disk 40 by a compression spring 214 wrapped around a stem 216 of reduced diameter at the outer end of each piston. A washer 218 fixed to the outer end of the stem 216 provides an abutment for receiving the force of the spring 214. Between the stem 216 and the slidable portion 212 of the piston is an intermediate portion 220 located to provide a face 222 which is acted upon by hydraulic fluid at a varying pressure. The hydraulic fluid is admitted to the face 222 through a series of conduits 224 which interconnect all six pistons acting upon the disk 184. The conduits 224 are coupled to a source of hydraulic fluid the pressure of which is regulated by the valve 112. At the lowest pressure controlled by the valve 112, the force of the spring 214 is sufficient to maintain the brake pad 210 out of contact with the disk 40. However, when the pressure of the hydraulic fluid through the valve 112 is increased the force on the piston face 222 is sufficient to overcome the spring 214 and thereafter with each increase in fluid pressure to increase the braking force applied to the disk 40.

The splice forming devices of the present apparatus are advantageously constructed for fast and reliable operation and coupled to web severing devices in such a way that the length of double web at the formation of each splice is limited to a very minimum. The splice forming instrumentalities comprise an upper nip roll 230 and a lower nip roll 232 (FIGS. 14 and 15) eccentrically mounted on shafts 234 and 236, respectively. The shafts 234 and 236 are journalled in plates 237 secured to the inside of the plates 20 and 22 and each shaft is coupled to a rotary actuator which imparts the necessary motion to its related shaft to carry a nip roll mounted upon it into contact with the other which is held in stationary position during the formation of a given splice.

The mounting of the rolls 230, 232 with respect to the shafts 234 and 236 is exactly the same and so the following description of the upper roll 230 will be understood to apply to both shafts. There is interposed between the shaft 234 and the roll 230, which is of rubber sheathed metal shell construction, a pair of spaced-apart eccentric bushings 238 keyed to the shaft near the ends of the roll. Surrounding each of the bushings 238 is a combined bearing and pneumatic seal 240, necessary because of the fact that the leading end of the ready web is held on the surface of the nip roll by vacuum before the formation of the splice. The left eccentric on each of the shafts 234 and 236 is provided with a passage 242 in communication with the inside of the roll 230 connected to vacuum hoses 244 and 246 respectively. Each of the rolls 230 and 232 is perforated in a single quadrant as shown at 248 and dynamically balanced. The hoses 244 and 246 are connected through appropriate valves to a vacuum pump for holding the leading end of the ready web by vacuum against the rolls 230 and 232 in position for splicing.

Figures 14, 15:
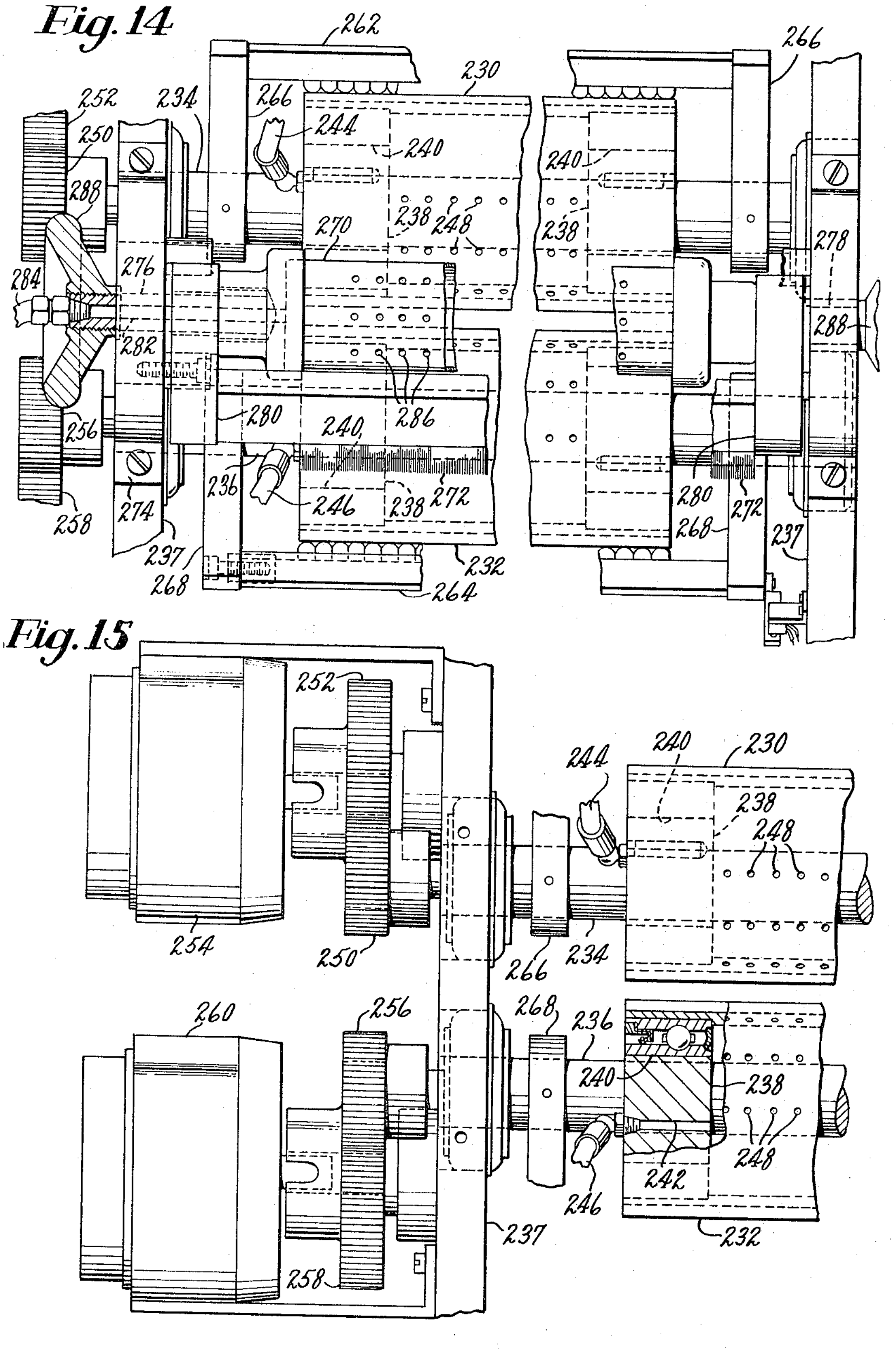
FIG. 14 is a detail view in rear elevation showing the construction of nip rolls, the mounting of web cutting knives, and a ready web preparation table.
FIG. 15 is a view similar to FIG. 14 but showing actuators for the nip rolls and with the web preparation table omitted for clarity.

Connections best seen in FIG. 15 are provided to the left end of the shafts 234, 236 for moving either one of them bodily while the other remains stationary for the purpose of forming a splice. For the shaft 234 these connections include a pinion 250 keyed to the shaft and meshing with a gear 252 mounted on the output shaft of a rotary actuator 254. Similar connections are provided for the shaft 236 and these include a pinion 256 keyed to the shaft and in engagement with a gear 258 mounted on the output shaft of a rotary actuator 260. The actuators 254 and 260 which are supported on the outside of the plate 237 impart a rotary motion to the shafts 234 and 236 respectively for imparting splicing motion to the rolls 230 and 232 and also to impart a web cutting motion to the related one of two knives 262 and 264. The knife 262 as seen in FIG. 14 is supported between the distal ends of two arms 266 pinned to the shaft 234 outside the roll 230. The knife 264 is similarly supported between the distal ends of two arms 268 pinned to the shaft 236.

Between the nip rolls 230, 232 is mounted the web preparation table 270 and a brush 272 which coacts with the knives 262, 264 for severing the depleted web. For supporting the table 270 and the brush 272 a pair of mounting blocks 274 (FIGS. 16 and 17) is fixed to the rear edge of the plates 237. The table 270 is supported on a pair of trunnions 276 and 278 which pass loosely through a pair of arms 280 for supporting the brush 272. The trunnion 276 is in the form of a tube providing an internal passage 282 in communication with a vacuum hose 284. The interior of the table 270 is hollow and perforations 286 (FIG. 14) in both its major surfaces are in communication through the passage 282 with the vacuum hose 284 so that web may be held on the surface of the table by vacuum. The cutting of the leading end of the web and its preparation either with a suitable splicing cement or double faced tape is conveniently carried out on the table 270. Both the table 270 and the brush 272 are movable and may be clamped in position by a pair of internally threaded hand wheels 288 engaging threads in the outer end of the trunnions 278 and 276.

Figures 16, 17:
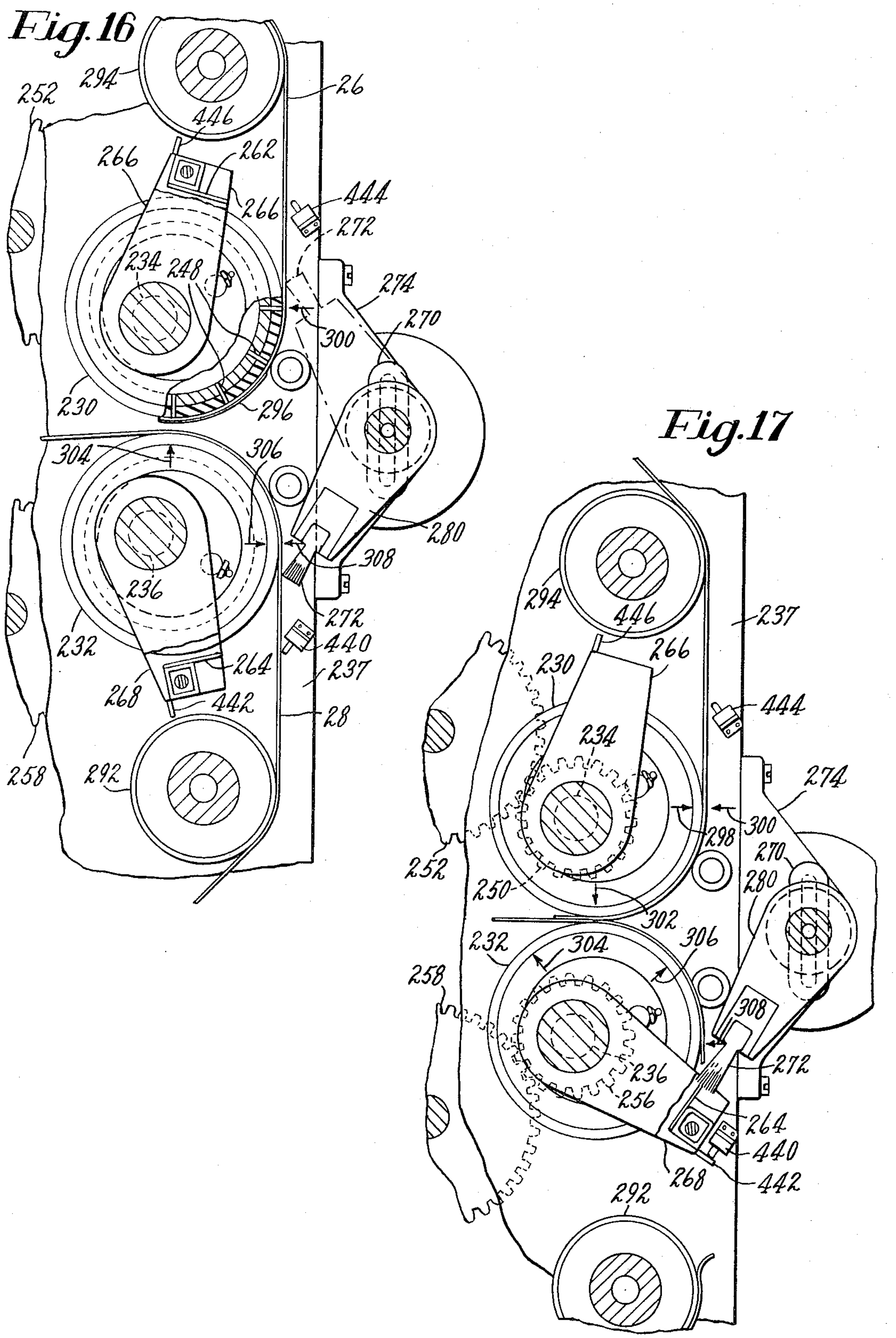
FIGS. 16 and 17 are fragmentary views in right side elevation and partially in section showing the nip rolls in successive splice forming positions.

In FIGS. 16 and 17 there is shown a splice ready to be formed and being formed between a running web from the lower supply roll 28 and a ready web from the upper supply roll 26. As shown in FIG. 16 the web passes over an idler roll 292 immediately below the nip roll 232 and a similar idler roll 294 is provided above the nip roll 234 for the web from the upper position 26. As depicted in FIG. 16 the web 28 is the depleting web, the table 270 with its longest dimension clamped in vertical position has been employed as a support for the preparation of the ready web 26 the leading end of which has been cut square and has received a coating of adhesive, for example, as indicated at 296. The leading end of the web 26 is supported on the nip roll 230 and the nip roll is angularly oriented in a predetermined position for the proper presentation of the ready web into contact with the running web. For this purpose an arrow 298 on the end of the nip roll 230 is matched with an arrow 300 scribed in the plate 237. An additional arrow 302 is scribed on the nip roll 230 to indicate the proper position for the leading edge of the ready web. On the roll 230 the leading end of the ready web is supported by vacuum reaching the web through the perforations 248. The brush 272 is oriented behind the running web 28 and clamped by hand wheels 288. To form the splice, the actuator 260 is energized in a manner which will be more fully described with reference to the electrical diagram. When the actuator 260 is energized it rotates the shaft 236 in a counterclockwise direction as seen in FIGS. 16 and 17 and the roll 232 is thus raised so that the running web 28 contacts the leading end of the ready web 26 to form the splice. At the same time the blade 264 moves toward the web 28 pushing it into engagement with the brush 272 and severing it as seen in FIG. 17. After a brief interval just sufficient to assure the formation of the splice, the actuator 260 is de-energized and the shaft 236 returned to position depicted in FIG. 16.

While the web is unwinding from the upper unwind position a new web supply roll is mounted into the lower position and the leading end of the new roll prepared in the same manner as that employed for the leading end of the roll 26. The leading end of the web is then retained on the nip roll 232, its leading edge being oriented in alinement with an arrow 304. The roll 232 is turned to its correct angular orientation which is determined when an arrow 306 on the end of the roll is alined with an arrow 308 scribed in the plate 237. The brush 292 is raised to the position depicted in dot-dash lines of FIG. 16 and clamped in position by the hand wheels. 288. The apparatus is now ready for the formation of the next splice either on command or in response to the predetermined depletion of the running web. When a ready web in the lower unwind position is to be adhered to a running web from the upper unwind position the actuator 254 is energized turning the shaft 234 to lower the nip roll 230 and thus bring the running web into contact with the cement at the leading end of the web 28. At the same time the knife 262 is actuated to cut off the running web 26 by driving it to and penetrating it in contact with the brush 272. After the splice has been formed the actuator 254 is de-energized and the shaft 234 returned to the position depicted in FIG. 16.

Figures 18, 19, 20:
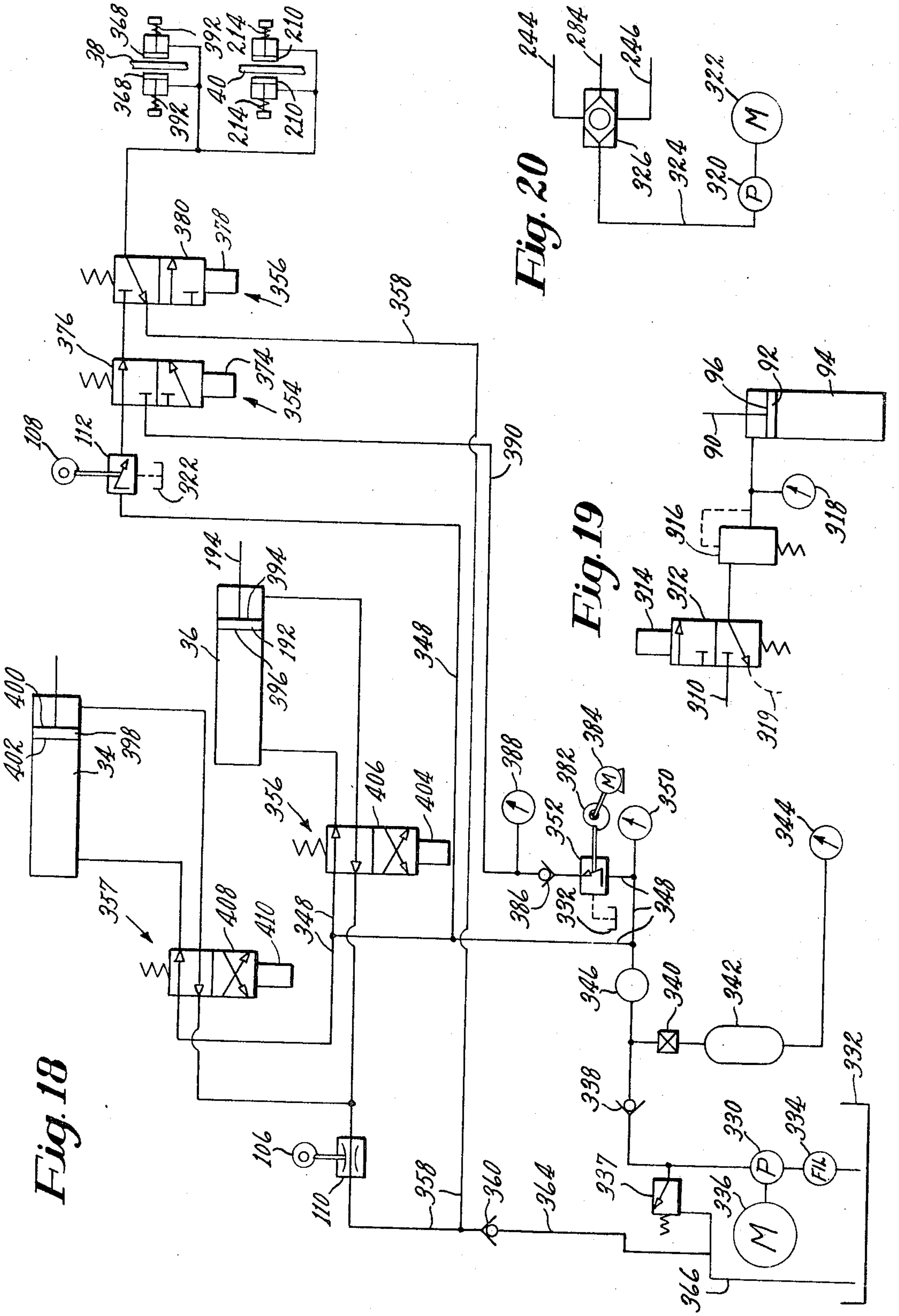
FIG. 18 is a schematic diagram of hydraulic connections of the apparatus.
FIG. 19 is a schematic diagram of a pneumatic circuit associated with the dancer roll assembly.
FIG. 20 is a schematic diagram of vacuum connections to the nip rolls and the web preparation table.

The operation of the dancer assembly will be understood by reference to FIG. 19 in which an incoming compressed air line 310 is shown in communication with the lower half of a spool 312 of a solenoid-operated three-way valve in which the solenoid is denoted by the reference character 314. There is interposed between the spool 312 and the upper chamber of the cylinder 94 a manually adjustable pressure regulator valve 316 and a pressure gage 318. When the solenoid 314 is de-energized the line 310, which is connected to a compressed air supply at approximately 125 p.s.i. is cut off from the cylinder 94. The upper chamber of the cylinder is vented through the regulator valve 316 and the lower half of the spool 312 to atmosphere at 319. When the solenoid 314 is energized communication is established between the line 310 through the upper half of the spool 312 with the upper chamber of the cylinder 94. The pressure of the air bearing on the upper surface 96 of the piston 92 is regulated by the valve 316. While the apparatus is in operation the solenoid 314 is continuously energized. The solenoid 314 is de-energized and pressure is thereby removed from the upper surface 96 of the piston 92 to cause the yoke 64 to descend to a level at which the rolls 56 and 58 are below the rolls 50, 52 and 54. This is done only to facilitate initial threading of a new roll of web when the apparatus is first put into service and under similar circumstances.

The connections of the nip rolls 230 and 232 and the preparation table 270 to a vacuum pump 320 is seen in FIG. 20. The pump 320 is directly coupled to a motor 322 and connected by a line 324 to a manually operated valve 326 conveniently located on the frame of the apparatus near the nip rolls and not otherwise shown in the drawings. In a first position of the valve 326 the vacuum line 324 is placed in communication through the valve with the hose 244 which is connected to the upper nip roll 230. In the central position of the valve 326 the vacuum line 324 is connected to a hose 284 which communicates in turn with the preparation table 270 through the passage 282. In the third position of the valve 326 the vacuum line 324 is placed into communication with the lower nip roll 232 through the hose 246. Thus by the proper positioning of the valve 326 vacuum may be applied to either nip roll for holding the leading end of a ready web in position for splicing or to the preparation table 270 where the leading end of the web is being readied before being applied to its related nip roll. When no vacuum is necessary either at the table 270 or at the nip rolls 230, 232, the motor 322 is de-energized and the vacuum pump 320 thus deactivated.

As shown in FIG. 18 a hydraulic pump 330 drawing fluid from a sump 332 through a filter 334 supplies pressurized fluid for web roll acceleration and braking. The pump 330 which is driven by a directly coupled motor 336 is provided with a pressure relief valve 337 and is connected through a check valve 338 and a manually-operated valve 340 to an accumulator 342. A gas pressure meter 344 is connected to the cushion side of the accumulator and a high and low pressure cut off switch assembly 346 for the motor 336 is connected to the junction of the valves 338 and 340. Conduits denoted as 348 and all at equal hydraulic pressure connect the output side of the switch 346 with a pressure gage 350. A programmed servo valve 352 and the servo valve 112 controlled by the dancer assembly 30 are interposed between the line 348 and a pair of solenoid operated three-way valves indicated generally at 354 and 356.

Return of hydraulic fluid back to the sump 332 is obtained through lines having a degree of back pressure to improve the reliability of operation of the various solenoid valves which are commercially available pilot-operated valves shown schematically in FIG. 18 without the pilots for simplicity. From the brake pads and from the servo valve 110 fluid is returned through conduits 358 which are at equal pressure, to a check valve 360 which maintains back pressure. The check valve 360 and the pressure relief valve 337 both empty through a return line 366 into the sump 332.

The part of the hydraulic circuit for applying a variable pressure to the brake pads 210 at the lower unwind position and to brake pads 368 which are of exactly the same construction as the pads 210 but act upon the disk 38 at the upper unwind position, includes the valves 354 and 356. The function of the valve 354 which includes a solenoid 374 and a spool 376 is that of shifting control of the pressure to the brake pads 210 and 368 from the servo valve 112 to the servo valve 352 at the appropriate time in the operating cycle of the apparatus. During normal unwind the pressure of the brake pads 210 and 368 is regulated by the servo valve 112 and as already seen the pressure reaching the brake pads depends on the orientation of the cam 108 which in turn is a measure of the quantity of web remaining in the dancer assembly 30 at any given instant. The valve 356 has a solenoid 378 for moving a spool 380. While the solenoid 374 is de-energized fluid under pressure passes from the valve 112 to the spool 380 of the valve 372. If the solenoid 378 is de-energized fluid from the valve 112 is blocked by the spool 380 and accordingly has no effect on the brake pads 210 and 368. When the solenoid 378 is energized, however, fluid from the valve 112 reaches the brake pads 210 and 368 through the lower half of the spool 380. Accordingly while the solenoid 374 is de-energized and the solenoid 378 energized, hydraulic fluid the pressure of which is controlled by the valve 112, presses upon the pads 210 and 368.

The valve 352 is one which is very similar to the valve 112 but its pressure output for the brake pads 210 and 368 is controlled by a motor driven cam 382 which makes a complete revolution at the start of a splicing cycle to apply gradually increasing pressure to the brake pads in order to reduce the speed of the running web at a planned rate matched to the operating parameters of web speed and strength. A driving motor 384 carries the cam 382 on its shaft and the energizing of the motor will be best understood from the later description of the electrical diagram. The variable output of the valve 352 is connected to the solenoid valve 354 through a check valve 386 and a pressure gage 388 is provided for indicating the pressure output of the valve 352 in a line 390 interposed between the check valve and the solenoid valve 354. Just prior to forming a splice the solenoid 374 is energized and the line 390 is thereby placed in communication through the lower half of the spool 376 with the valve 356 which normally has its solenoid 378 energized as already explained. The line 390 is accordingly in communication with both sets of brake pads 210 and 368 through lower halves of the spools 376 and 380. The motor 384 is energized at this time and the hydraulic fluid at a programmed increase in pressure is applied to the pads 210 and 368. It will be noted that the output of the servo valve 352 is applied to both sets of pads 210 and 368 but only that set of pads associated with the running web is effective since the full roll of web at the other unwind station is stationary at the time.

After the web has been decelerated to the predetermined splicing speed through the programmed increase in hydraulic pressure to the pads 210 and 368, the solenoid 374 of the valve 354 is de-energized thereby shifting control of braking force from the valve 352 to the valve 112. At this time under normal speeds of the web consuming machine, the quantity of web in the dancer assembly 30 has usually been substantially reduced. Since the pressure output of the servo valve 112 is generally proportional to the quantity of web stored in the dancer assembly 30, the controlled pressure supplied to the brake pads 210, 368 by this valve is at a minimum immediately when the servo valve 112 regains control by the de-energization of the solenoid 374 of the valve 354. This minimum pressure is generally insufficient to overcome the force of the springs 214 associated with the brake pads 210 and of similar springs 392 depicted only schematically in FIG. 18 in association with the pads 368. Under such conditions the brake disks 38 and 40 are usually free of braking pressure from their respective pads 368 and 210 at the time when the ready web roll is being accelerated.

In general the arrangement for modulating the speed of the piston 192 for accelerating the web roll 28 consists in applying to the outer or high pressure surface 394 of the piston the full force of the hydraulic fluid under the pressure available in the line 348 while controlling the flow of hydraulic fluid escaping from the back chamber of the cylinder 36 formed between the closed end of the cylinder and the inner surface 396 of the piston. The exhaust of hydraulic fluid from the back chamber of the cylinder 36 is controlled by the valve 110 which offers a variable restriction in accordance with the position of the cam 106. As has already been seen, the cam 106 is formed to cause the valve 110 to offer minimum restriction to the flow of hydraulic fluid and hence maximum kick to the new web roll when the web in the dancer assembly 30 is more fully depleted.

There is mounted in the cylinder 34 a piston 398 having an outer surface 400 and an inner surface 402 and bearing the same relation to the cylinder 34 as that already described with reference to the cylinder 36. The two three-way valves 356 and 357 are selectively energized and de-energized to actuate the pistons 192 and 398 in accordance with whether the web supply roll in the lower or upper position is to be accelerated. The valve 356 while its solenoid 404 is de-energized provides a passage in the upper half of its spool connecting the high pressure line 348 with the rear chamber of the piston 36. At the same time the upper end of the spool 406 also provides a connection between the forward chamber of the cylinder 36 and the servo valve 110. Under these conditions the piston 192 is urged to the right as seen in FIGS. 1 and 18 and is thus reset for its next web roll accelerating stroke. When the solenoid 404 is energized the spool 406 shifts upwardly as seen in FIG. 18 and reverses the connections between the cylinder 36 on the one hand and the valve 110 and the line 348 on the other. Thus the forward chamber of the cylinder 36 is placed in communication through the lower half of the spool 406 with the high pressure hydraulic line 348 and the full force of the hydraulic fluid is applied to the face 394 of the piston 192. At the same time the rear chamber of the cylinder 36 is placed in communication through the lower half of the spool 406 with the servo valve 110. The solenoid 404 is energized for accelerating the new web supply roll in the lower unwind position, that occupied by the roll 28 in FIG. 1. The speed of the stroke of the piston 192 is varied under the constant pressure applied to the face 394 by the variable passage offered by the valve 110 through which the fluid from the rear chamber of the cylinder 36 must pass during the accelerating stroke of the piston. If the demand speed of the web consuming machine is great and considerable depletion of the reservoir provided by the dancer assembly 30 accordingly occurs during slowing down for the formation of splice, the face of the cam 106 which is coupled to the yoke 64 causes the passage through the valve 110 to be wide open and hence the web supply roll in the lower unwind position receives a quick impulse for immediate replenishment of the web normally stored in the dancer assembly. If on the other hand the web consuming machine operates at a slower speed and little depletion of the web supply in the dancer assembly 30 takes place during slowing down for the formation of the splice, the cam 106 causes closure of the valve 110 so that the stroke of the piston 192 is much slower and the acceleration of the web supply roll accordingly is much more gradual.

A similar circuit to that already described is related to the cylinder 34 at the upper unwind station and comprises the valve 357 having a spool 408 operated by a solenoid 410. Like the solenoid 404 of the valve 356, the solenoid 410 is energized only when a related web supply roll is to be accelerated. While the solenoid 410 is de-energized communication is established through the upper end of the spool 408 between the rear chamber of the piston 34 and the high pressure line 348 at the same time that the forward chamber is placed in communication with the valve 110. Under these conditions the piston 398 moves forwardly to the right as seen in FIG. 18 to be ready for a web roll accelerating stroke. When the solenoid 410 is energized an accelerating kick is provided to the new web supply roll at the upper unwind position hydraulic fluid under pressure from the line 348 entering the forward chamber of the cylinder 34 through the lower half of the spool 408 at the same time that the rear chamber of the cylinder 34 is placed in communication through the lower half of the spool 408 with the valve 110. The same control is exercised by the valve 110 over the stroke of the piston 398 as that already described with reference to the piston 192.

The size of the running web roll is measured continuously by devices provided at each of the unwind stations so that the splicing of the new roll may be triggered automatically when the running web roll is depleted to a predetermined degree. For this purpose there is contacting the periphery of the roll 28 at the lower unwind station a roller 416 rotatable on the distal end of an arm 418 pivoted on the plate 20 at 420 (FIGS. 1 and 3). The arm 418 is urged in the counterclockwise direction as seen in FIG. 1 to maintain the roll 416 in contact with the web supply roll 28 by a spring 422. The arm 418 is formed with a tail 424 which, when the roll 28 has reached the predetermined degree of depletion depresses the plunger of a normally open switch 426 adjustably supported on the plate 20. At the upper unwind station a similar arrangement is provided and comprises an arm 428 pivoted on the plate 20 at 430. There is mounted at the distal end of the arm 428 a roller 432 maintained in contact with the web supply roll 26 by a tension spring 434. When the roll 26 has reached the predetermined degree of depletion a tail 436 on the lever 428 depresses the plunger of a normally opened switch 438 adjustably supported on the plate 20.

As will be seen from the description of the electrical diagram, the new web supply roll is accelerated only after the running web has been cut. An interlock is provided as seen in FIG. 17 and comprises a normally open plunger operated switch 440 adjustably supported on one of the plates 237. The knife supporting arm 268 nearest the switch 440 is formed with a finger 442 which engages the plunger of the switch when the knife completes its web cutting motion. A similar arrangement is provided to signal the completion of a cutting stroke of the knife 262 and comprises a normally open switch 444 the plunger of which is depressed by a finger 446.

The operation of the present apparatus will be more fully understood from the following description of the electrical circuit depicted in FIGS. 21 and 21*a* which are to be considered a single figure. Power at 117 volts 60 cycles A.C. is provided to the electrical devices through lines 450 and 452. The line 450 is provided with a fuse FU–1 and is connected through a main switch 454 with a secondary line 456. When the switch 454 is closed the full supply voltage appears across the lines 452 and 456.

For starting the apparatus a roll of web is mounted into the lower unwind position, for example, and while no pressurized air is connected to the cylinder 94 and the rolls 56 and 58 are below level of the rolls 50, 52, and 54, the web is guided under the roll 291 and around the idler roll 292 below the nip roll 232 as seen in FIG. 1. From the idler roll 292 the web is threaded over the nip roll 232 and through the nip zone between the two nip rolls to the idler roll 70 and from that point successively over the rolls 50, 56, 52, 58 and 54 of the dancer assembly 30. Upon emerging from contact wtih the roll 54, the web is threaded through the web consuming machine.

After the web has been threaded, a number of circuits are energized to actuate the apparatus for controlling the unwind of web. One of these circuits for starting the hydraulic pump motor 336 includes a toggle switch 464 which when closed energizes a motor contactor M1 through the combination of pressure switches and contacts 346 already described with reference to the hydraulic diagram, FIG. 18. When the contactor M1 is energized an indicator lamp L1 in parallel with the contactor is also energized. The pressure switch assembly 346 maintains pump pressure in a relatively narrow range for example, between 900 and 1100 p.s.i. For this purpose the switch assembly 346 comprises a low pressure switch 466 and a high pressure switch 468. The low pressure switch, which is in parallel with a pair of normally open contacts indicated at 470, opens when the line pressure reaches 900 p.s.i. and the switch 468 opens when the pressure reaches 1100 p.s.i. When the contactor M1 is energized to start the hydraulic pump motor, however, the normally open contacts 470 are closed and the contactor M1 remains energized when the switch 466 thereafter opens. The switch 468 then opens each time the pressure of the line 348 reaches 1100 p.s.i.

A circuit is provided for energizing the solenoid 378 to place the brake pads in communication with the output of the servo valve 112. This circuit includes a normally open switch 470 in series with a relay coil 1CR across the lines 452 and 456. When the switch 470 is closed momentarily the relay coil 1CR is energized and a pair of contacts 1CR–A is energized in parallel with the switch 470 to provide a circuit to maintain the relay coil 1CR energized after the switch 470 is allowed to open. A normally closed switch 478 is in series with the contacts 1CR–A across the switch 470 and this switch is opened momentarily when it is desired to de-energize the relay coil 1CR. A lamp L2 is in parallel with the relay coil 1CR and conveniently mounted on a control panel to indicate that the relay coil is energized and performing its designed function. When the relay coil 1CR is energized a second pair of contacts 1CR–B in series with the solenoid 378 is closed and the solenoid is accordingly energized.

Another circuit is provided for energizing the solenoid 314 to supply air under pressure to the cylinder 94 in order to lower the piston 92 in the cylinder and thus raise the yoke 64 of the dancer assembly to store a quantity of web. This circuit comprises a normally open switch 474 in series with a relay coil 2CR across the lines 452 and 456. When the switch 474 is momentarily closed the relay coil 2CR is energized closing a pair of contacts 2CR–A which are in parallel with the switch 474 and serve to maintain the coil 2CR energized after the switch 474 is allowed to open. In series with the contacts 2CR–A across the switch 474 is a normally closed switch 476 which is opened momentarily to interrupt the flow of current to the coil 2CR. An indicator lamp L3 is in parallel with the coil 2CR and is accordingly lit when the coil is energized. When the coil 2CR is energized a second pair of contacts 2CR–B is closed and these contacts in closing complete a circuit to energize the valve solenoid 314. When the solenoid 314 is energized air under pressure is supplied through the upper half of the spool 312 and the regulator valve 316 to the upper chamber of the cylinder 94.

The circuits already described control the unwinding of web from both unwind positions and the circuits to be hereinafter described are used for controlling the formation of the splice. It will be assumed that after the web supply roll at the lower unwind position has been set in motion and the web consuming machine is operating normally that a new web supply roll is prepared and mounted in the upper unwind position as already described.

Control circuits for the splice function are energized by momentarily closing a switch 479 causing current flow in a relay coil 3CR which is in parallel with an indicator lamp L4. When the coil 3CR is energized contacts 3CR–A which are normally open close and serve to maintain the coil 3CR energized through a holding circuit also including a normally closed switch 480 and normally closed contacts TDR–A. The switch 480 is momentarily opened when it is desired to de-energize the coil 3CR. The contacts TDR–A are delayed approximately 10 seconds in opening when a time delay relay coil TDR is energized as will later appear. The lamp L4 when lit indicates that apparatus is ready to form a splice upon command or automatically when the running web is depleted to a predetermined degree. Another lamp L5 when lit indicates that the relay coil 3CR is de-energized and that the switch 479 must be closed to prepare the apparatus for the formation of a splice. The lamp L5 is in series with a pair of normally closed contacts 3CR–B which are opened when the coil 3CR is de-energized. Another pair of contacts associated with the coil 3CR, the contacts 3CR–C, which are normally open are in series with a contactor M2. When the contacts 3CR–C are closed and the contactor M2 is energized the vacuum pump motor 322 is thereby energized. A fourth set of contacts normally open contacts 3CR–D are closed when the relay coil 3CR is energized and in closing prepare circuits to be actuated at the time of splice formation. When the relay contacts 3CR–D are closed the circuits to be described are connected to a line 481 and through the contacts 3CR–D to the secondary line 456.

Assuming that the running web is unwinding from the lower unwind position and a ready web roll has been mounted in the upper unwind station with its leading end prepared and laid on the upper nip roll 230, the splicing cycle may be initiated by momentarily closing a normally open switch 482 which energizes a relay coil 5CR. If the running web roll at the lower unwind station is almost fully depleted before the switch 482 is closed, the switch 426 also seen in FIG. 1 and in parallel with the switch 482 will be closed automatically and this switch is in parallel with the switch 482. When the relay coil 5CR is energized by closing of either of the switches 482 or 426 a pair of normally open contacts 5CR–A are thereby closed to maintain the coil 5CR energized after either or both of the switches 482 and 426 are allowed to open. A second pair of normally open contacts associated with the relay coil 5CR, the contacts 5CR–B, are closed when the coil 5CR is energized and thereby energize a time delay relay coil TDR. The purpose of the time delay relay TDR which has associated with it only a single pair of normally closed contacts TDR–A is to de-energize the various splice controlling circuits after the splice has been formed. For this purpose the relay contacts TDR–A open 10 seconds after the coil TDR is energized. This period of time is ample for the completion of the splicing cycle which is variable but normally consumes approximately 2 seconds or less after the relay coil 5CR is energized and the contacts 5CR–B closed.

After the relay coil 5CR is energized the splice is formed only when the speed of the running web as measured by the tachometer wheel 42 is reduced to the predetermined level. The speed of the web is measured by a tachometer generator 484 upon the shaft of which the wheel 42 is mounted. The voltage output of the generator 484 is proportional to the speed of the web. When the speed of the web is reduced to the predetermined level, 150 feet per minute for example, a signal coil 486 which is coupled to a vane 488 allows the vane to close a meter relay circuit by engaging an adjustably fixed contact 490. The meter relay circuit comprises a bridge rectifier 492 energized at 110 volts A.C. through normally open contacts 3CR–E to provide a D.C. output voltage. Thus when the switch 479 is closed and the relay coil 3CR energized the bridge rectifier 492 has a D.C. output for energizing circuit components in series with the tachometer switch comprising the vane 488 and 490. This circuit including normally open relay operated contacts 5CR–F and 6CR–F also comprises a holding coil 494 which maintains the vane 488 in engagement with the contact 490 as soon as vane touches the contact 490 while the contacts 3CR–E and either the contacts 5CR–F or 6CR–F are closed. Under these circumstances a meter relay MR is energized through a current limiting resistor R1.

As shown in FIG. 21*a* two sets of contacts are associated with the relay coil MR. One of the sets, the normally closed contact MR–A is in series with the valve solenoid 374 and a pair of contacts 5CR–C which are closed when the relay coil 5CR is energized to start the splice. When the solenoid 374 is energized the output of the programmed servo valve 352 is placed into communication with the brake pads 210 and 368 to begin the deceleration of the running web roll. When the contacts MR–A open the relay coil MR has been energized as a result of reaching a predetermined slow speed, the splicing speed, as measured by the tachometer generator 484. Control over the hydraulic pressure to the brake pads 210 and 328 is returned to the dancer controlled servo valve 112 when the solenoid 374 is de-energized as a result of the opening of the contacts MR–A. The second set of contacts associated with the relay coil MR, normally open contacts MR–B are in series with the rotary actuator 260 and a pair of normally open contacts 5CR–D also closed by the relay coil 5CR. Thus when the relay contacts MR–B close as a result of reaching the predetermined splicing speed the actuator 260 is energized, raising the nip roll 32 to the position shown in FIG. 17 and thus pressing the running web into contact with the leading end of the ready web from the upper unwind station supported on the nip roll 230 which remains free to rotate about a stationary axis during this particular splicing operation. At the same time the knife 264 is actuated to cut off the running web 28.

At the time that the solenoid 374 is energized to transfer brake control from the servo valve 112 to the servo valve 352 the motor 384 is energized by closure of a pair of contacts 5CR–E of the coil 5CR. The motor 384 has a geared down output shaft which carries the cam 382 shown in FIG. 18 to provide the programmed input to the valve 352. There is also mounted on the output shaft of the motor 384 a cam 496 which opens and closes a switch 498. When the contacts 5CR–E are closed the motor 384 starts to rotate and the cam 496 is so shaped that the switch 498 which is normally open is closed by the cam and remains closed until the output shaft of the motor 384 has completed a full revolution.

When the rotary actuator 260 completes its nip roll moving and web cutting stroke the switch 440 is closed and in so doing signals that the running web has been cut. The switch 440 is in series across the lines 452 and 481 with the solenoid 410 of the valve 357. When the switch 440 closes the solenoid 410 is accordingly energized to initiate the accelerating stroke imparted to the ready web roll at the upper unwind station. It is thus seen that acceleration of the ready web occurs only in response to a signal that the running web has been cut and as already described with reference to the hydraulic diagram, FIG. 18, the accelerating stroke imparted to the new web roll is modulated by the valve 110 in accordance with the quantity of web remaining in the dancer assembly at the time.

The acceleration of the ready web roll completes the splicing operation and provision is included in the present apparatus for deactivating all the splice controlling circuits after the splicing cycle is terminated. For this purpose the contacts TDR–A which are actuated by the time delay relay coil TDR open after a period of approximately 10 seconds following the energization of the coil TDR. This 10 second period is sufficient for the completion of the web accelerating stroke of the piston 398. When the contacts TDR–A open at the end of the 10 second period the relay coil 3CR is de-energized and the contacts 3CR–D accordingly open. When the contacts 3CR–D open the relay coil 5CR is de-energized thereby opening all of its contacts. The opening of the contacts 5CR–A removes the holding circuit for the coil 5CR. When the contacts 5CR–B are opened the time delay relay coil TDR is de-energized which closes the contacts TDR–A but has no immediate effect since the contacts 3CR–A are then open. The opening of the contacts 5CR–C has no effect since the solenoid 374 has been de-energized upon opening of the normally closed contacts MR–A as a result of the meter relay coil MR being energized when the predetermined splicing speed is reached. The effect of the opening of the contacts 5CR–D is to de-energize the rotary actuator 260 so that the nip roll 232 and the knife 264 are spring returned to the positions depicted in FIG. 16. The opening of the contacts 5CR–E has no effect since the cam-actuated switch 498 remains closed for a full revolution of the output shaft of the motor 384 and is then opened by the cam 496. When the contacts 5CR–F open the meter relay coil MR is de-energized and the opening of the contacts 3CR–E removes the power input to the bridge rectifier 492.

Control of the splicing of a ready web from the lower unwind station to a running web from the upper unwind station is accomplished by circuits which exactly duplicate those already described for splicing the leading end of web from the upper unwind station. In initiating a splice of a new roll of web in the lower unwind station, the switch 479 is first momentarily closed to energize the relay coil 3CR which has the same effect as that already described including the closing of the relay contacts 3CR–D which connect the line 481 to the line 456. The splicing cycle proper for the lower web roll is initiated either by momentarily depressing a manually controlled push button switch 500 which is in series with a relay coil 6CR across the lines 452, 482 or by closure of the switch 438 which occurs when the web supply roll at the upper unwind station has reached the predetermined degree of depletion. Whether the switch 50 is closed to splice on command or the switch 438 is closed to splice automatically the effect is that the relay coil 6CR is energized. When this occurs a pair of normally open contacts 6CR–A are closed and by being in parallel with the switches 500 and 438 provide a holding circuit for the relay coil 6CR. A second pair of normally open contacts 6CR–B is in parallel with the contacts 5CR–B and in series with the time delay relay coil TDR. When the contacts 6CR–B are closed upon energization of the relay coil 6CR, the coil TDR is energized and begins to toll its 10 second period at the expiration of which the normally closed contacts TDR–A open as already explained. Another pair of normally open contacts 6CR–C are closed when the coil 6CR is energized and these contacts in parallel with the normally open contacts 5CR–C are in series with the solenoid 374 of the valve 354 and the normally closed contacts MR–A operated by the meter relay MR. As explained in connection with the splicing of the upper web supply roll, the effect of the solenoid 374 being energized is to switch control of braking pressure from the servo valve 112 to the servo valve 352. This condition in the case of the lower web splicing also obtains until the predetermined splicing speed is reached and the meter relay coil MR is energized to cause the normally closed contacts MR–A to open thereby de-energizing the solenoid 374 and returning the control of the braking force to the servo valve 112.

A pair of normally open contacts 6CR–D is also closed when the relay coil 6CR is energized and these contacts are in series with the rotary actuator 254 and the normally open contact MR–B. Thus when the contacts MR–B are closed after the splicing speed has been reached the rotary actuator 254 is energized to lower the nip roll 230 and thus press the web from the upper unwind station into contact with the leading end of the web from the lower unwind station, which is supported on the nip roll 232. In splicing web from the lower unwind station to a running web from the upper unwind station only the nip roll 232 moves, the nip roll 230 remaining stationary. When the actuator 254 is energized, at the same time that it effects the lowering of the nip roll 230 it also causes the knife 262 to pivot toward the brush 272 as shown in its dot and dash position in FIG. 16 and thereby sever the running web from the upper unwind station. As the knife 262 completes its web cutting stroke. the switch 444 is closed by the finger 446 to cause the solenoid 404 of the valve 356 to be energized. When the solenoid 404 is energized communication is established between the high pressure hydraulic line 348 through the lower half of the spool 406 with the forward face 394 of the piston 192. At the same time the rear chamber of the cylinder 36, that between the bottom of the cylinder and the rear face 396, is placed in communication through the lower half of the spool 406 with the servo valve 110 which controls the exhaust of hydraulic fluid from the back chamber of the cylinder 36 and hence the speed of the accelerating stroke imparted by the piston 192 to the new web supply roll at the lower unwind position.

When the relay coil 6CR is energized a normally opened set of contacts 6CR–E in parallel with the contacts 5CR–E, is closed to energize the motor 384 for controlling the output pressure of the servo valve 352 applied to the brake pads 210 and 368 during deceleration of the running web roll. The contacts 6CR–E are also in parallel with the switch 498 which is cam-controlled to assure that the motor 384 is de-energized after its output shaft has completed a full revolution.

A final pair of normally open contacts 6CR–F is closed when the relay coil 6CR is energized. These contacts are in parallel with the contacts 5CR–F and when closed provide a circuit through which the meter relay MR is energized when the vane 488 engages the contacts 490 after the contacts 3CR–E have been energized.

At the end of the 10 second interval already mentioned the splice has already been formed and the normally closed contacts TDR–A open causing the relay coil 3CR to be de-energized and the contacts 3CR–D to open. When the contacts 3CR–D open the relay coil 6CR is de-energized and all its contacts including the holding contacts 6CR–A are opened. The contacts 6CR–B in opening cause the time delay relay coil TDR to be de-energized. The opening of the contacts 6CR–C upon de-energization of the coil 6CR has no effect upon the solenoid 374 since it has been de-energized by the opening of the normally closed contacts MR–A when the splicing speed was reached. The opening of the contacts 6CR–D de-energizes the rotary actuator 254 and allows the nip roll 230 and the knife 262 to be spring returned to the positions depicted in FIG. 16. When the contacts 6CR–E are opened there is no effect since the motor 384 is de-energized after a full revolution by the opening of the switch 498. The opening of the contacts 6CR–F causes the coil MR to be de-energized.

Having thus described our invention, what we claim as new and desire to secure by Letters Patent of the United States is:

1. Web supply apparatus comprising means for rotatably supporting a roll of running web at a running web station, means for supporting a roll of ready web at a ready web station, means for splicing the leading end of the ready web to the running web, a dancer assembly for storing a quantity of web, means for decelerating the running web entering the dancer assembly at a pre-determined rate while maintaining a constant output speed from the dancer assembly before forming a splice and means for actuating the splicing means in response to reaching a pre-determined splicing speed of the running web entering the dancer assembly.

2. Web supply apparatus comprising means for rotatably supporting a roll of running web at a running web station, means for supporting a roll of ready web at a ready web station, means for splicing the leading end of the ready web to the running web, a dancer assembly for storing a quantity of web, means for decelerating the running web entering the dancer assembly while maintaining a constant output speed from the dancer assembly before forming a splice, means for imparting an accelerating kick to the ready web after the splice has been formed and means for modulating the kick imparted to the ready web in accordance with the quantity of web remaining in the dancer assembly.

3. Web supply apparatus comprising means for rotatably supporting a roll of running web at a running web station, means for supporting a roll of ready web at a ready web station, means for splicing the leading end of the ready web to the running web, a dancer assembly for storing a quantity of web, means including a brake at each station for decelerating the running web entering the dancer assembly while maintaining a constant output speed from the dancer assembly before forming a splice, means for imparting an accelerating kick to the ready web after the splice has been formed, means for modulating the kick imparted to the ready web in accordance with the quantity of web remaining in the dancer assembly and means for thereafter varying the braking force in accordance with the quantity of web in the dancer assembly while the web is unwinding.

4. Web supply apparatus comprising means for rotatably supporting a roll of running web at a first station, means for supporting a roll of ready web at a second station, means for splicing the leading end of the ready web to the running web, a dancer assembly for storing a quantity of web, a brake coupled to each web roll, means connected to the dancer assembly for translating the quantity of stored web into a variable braking force applied to the brake, means for imparting an accelerating kick to the ready web after the splice has been formed and means for modulating the kick imparted to the ready web in accordance with the quantity of web remaining in the dancer assembly.

5. Apparatus for controlling the unwinding of web being fed to a web consuming machine comprising means for rotatably supporting a roll of running web, a dancer assembly for storing a quantity of web including a movable yoke a plurality of dancer rolls rotatably mounted on the yoke, an equal number of web guiding rolls rotatable about stationary axes and defining with the dancer rolls a variable web storing path and a fluid operated piston coupled to the yoke for urging it in a web storing direction, a brake coupled to the web supply roll and means for applying a variable force to the brake in response to the position of the yoke.

6. Apparatus for controlling the unwinding of web being fed to a web consuming machine comprising means for rotatably supporting a roll of running web, a dancer assembly for storing a quantity of web, a brake coupled to the web supply roll, means for applying a variable force to the brake in accordance with the quantity of web remaining in the dancer assembly and decelerating means actuatable on command for applying a force to the brake at a programmed rate.

7. Apparatus according to claim 6 further comprising a tachometer means for sensing web speed and means operating in response to the tachometer when the speed of the web has been reduced to a pre-determined level for de-activating the decelerating means.

8. Web supply apparatus for a web consuming machine comprising means for rotatably supporting a roll of running web, means for rotatably supporting a roll of ready web, a web splicing means, a dancer assembly independently of the web demand speed of the consuming machine between the splicing means and the web consuming machine, means for reducing the speed of the running web entering the dancer assembly in preparation for the formation of a splice and means for actuating the web splicing means in response to reaching a pre-determined splicing speed.

9. Web supply apparatus for a web consuming machine comprising means for rotatably supporting a roll of running web, means for rotatably supporting a roll of ready web, a web splicing means, dancer means for storing web between the splicing means and the web consuming machine, a brake coupled to each web roll, hydraulic means for applying a braking force to the brakes, a first pressure control means coupled to the dancer means for regulating hydraulic pressure applied to the brake during unwinding of the web, programmed control means for regulating the hydraulic pressure applied to the brakes in decelerating the web before forming a splice and means for actuating the splicing means in response to reaching a pre-determined splicing speed.

10. Web supply apparatus for a web consuming machine comprising means for rotatably supporting a roll of running web, means for rotatably supporting a roll of ready web, a web splicing means, dancer means for storing web between the splicing means and the web consuming machine, means for reducing the speed of the running web in preparation for the formation of a splice, means for actuating the splicing means in response to reaching a pre-determined splicing speed, accelerator means for imparting a single torsional kick to the ready web roll at the time of splice formation and means for modulating the torsional kick in accordance with the quantity of web depleted from the dancer means before the splice is formed.

References Cited by the Examiner

UNITED STATES PATENTS

| | | | |
|---|---|---|---|
| 2,930,427 | 3/1960 | Fillman et al. | 242—58.1 X |
| 3,161,368 | 12/1964 | Allen | 242—75.3 X |

FRANK J. COHEN, *Primary Examiner.*

L. D. CHRISTIAN, *Assistant Examiner.*

PO-1050
(5/69)

UNITED STATES PATENT OFFICE
CERTIFICATE OF CORRECTION

Patent No. 3,305,189 Dated February 21, 1967

Inventor(s) Richard A. Butler & Norton T. Pierce

It is certified that error appears in the above-identified patent and that said Letters Patent are hereby corrected as shown below:

Column 18, line 58 cancel beginning with "independent-" to and including "machine" in line 59; line 62 after "assembly" insert -independently of the web demand speed of the consuming machine- Signed and sealed this 10th day of September 1974.

(SEAL)
Attest:

McCOY M. GIBSON, JR.
Attesting Officer

C. MARSHALL DANN
Commissioner of Patents